(12) United States Patent  
Remiszewski et al.

(10) Patent No.: US 9,574,968 B2  
(45) Date of Patent: Feb. 21, 2017

(54) METHODS AND SYSTEMS FOR USING LOW-EMISSIVITY SLIDES FOR SPECTRAL HISTOPATHOLOGY (SHP) AND SPECTRAL CYTOPATHOLOGY (SCP)

(71) Applicant: CIRECA THERANOSTICS, LLC, Parsippany, NJ (US)

(72) Inventors: Stanley H. Remiszewski, Spencer, MA (US); Max Diem, Jamestown, RI (US); Aysegul Ergin, Arlington, MA (US)

(73) Assignee: CIRECA THERANOSTICS, LLC, Parsippany, NJ (US)

(*) Notice: Subject to any disclaimer, the term of this patent is extended or adjusted under 35 U.S.C. 154(b) by 0 days.

(21) Appl. No.: 14/961,508

(22) Filed: Dec. 7, 2015

(65) Prior Publication Data

US 2016/0161365 A1    Jun. 9, 2016

Related U.S. Application Data

(60) Provisional application No. 62/088,365, filed on Dec. 5, 2014.

(51) Int. Cl.
```
G01J 3/00      (2006.01)
G01M 11/08     (2006.01)
G02B 21/34     (2006.01)
```
(52) U.S. Cl.
CPC ............ *G01M 11/08* (2013.01); *G02B 21/34* (2013.01)

(58) Field of Classification Search
CPC ........... G01M 11/08; G02B 21/34; G01J 3/02; G01J 3/42; G01J 3/28; G01N 21/31; G01N 21/55
See application file for complete search history.

(56) References Cited

U.S. PATENT DOCUMENTS

| | | | |
|---|---|---|---|
| 5,671,288 A | 9/1997 | Wilhelm et al. | |
| 5,945,674 A | 8/1999 | Dukor | |
| 6,381,013 B1* | 4/2002 | Richardson | H01J 37/20 356/305 |
| 2002/0164810 A1 | 11/2002 | Dukor et al. | |
| 2004/0227937 A1 | 11/2004 | Richardson | |
| 2007/0148792 A1 | 6/2007 | Marx et al. | |
| 2012/0275671 A1 | 11/2012 | Eichhorn et al. | |

OTHER PUBLICATIONS

International Search Report of PCT/US2015/064313 dated Mar. 2, 2016.

* cited by examiner

*Primary Examiner* — Abdullahi Nur (74) *Attorney, Agent, or Firm* — Arent Fox LLP (57) ABSTRACT

The methods, systems, and devices may include performing one or more quality tests to determine and/or certify the quality of slides used in infrared imaging. The methods, systems, and devices may certify a quality of a slide when the average quality assessment of the slide is within the established quality value range.

19 Claims, 11 Drawing Sheets

METHODS AND SYSTEMS FOR USING LOW-EMISSIVITY SLIDES FOR SPECTRAL HISTOPATHOLOGY (SHP) AND SPECTRAL CYTOPATHOLOGY (SCP)

RELATED APPLICATION

This application claims priority to U.S. Provisional Patent Application No. 62/088,365 titled "METHODS AND SYSTEMS FOR USING LOW-EMISSIVITY SLIDES FOR SPECTRAL HISTOPATHOLOGY(SHP) AND SPECTRAL CYTOPATHOLOGY(SCP)" filed Dec. 5, 2014, which is hereby incorporated by reference in its entirety.

SUMMARY

In Spectral Histopathology (SHP) and spectral cytopathology (SCP), the sample (tissues sections sliced from tissue blocks, or cells or cell smears deposited by a number of different procedures, respectively) are interrogated by a beam of infrared light. Light absorbed at different wavelengths can be represented as an infrared (IR) spectrum that contains a snapshot of the biological composition of the sample.

IR spectra may be collected in transmission or in reflection. In the former case, the sample substrates often are expensive, since they must be transparent in the infrared spectral region (2.5 to 25 μm wavelength) and insoluble in water. Standard glass cannot be used since it is opaque in the IR region. For reflection measurements, the sample can be mounted on a glass substrate that is covered by a reflective layer. The IR beam passes through the sample, is reflected by the reflective layer, and passes the sample again. This measurement arrangement is referred to as "transflection."

The transflection patterns ("IR spectra") obtained from tissues may be used to detect and classify disease, in particular the types, stages and grades of cancer. To accomplish this task, the reflectivity and the homogeneity of the reflectivity of the sample substrate may be of prime importance. Any heterogeneity in reflectance may produce errors in the transflection spectra of as much as 0.02 optical density (OD) units. Such an error at certain wavelength could falsify the spectral classification and/or analysis of the IR spectra.

Currently slides used in Fourier transform infrared spectroscopy (FTIR) imaging may include reflection-coated glass, for example used in skyscrapers, which transmits visual light and reflects IR. However, the glass coatings from skyscraper windows, in general, do not conform to the high level of homogeneity in reflectivity required for retrieving a reliable spectral signal from a biological sample. As such, the quality and optical properties of the glass may vary among the slides. Variations in the glass may produce errors at certain wavelengths, and therefore, may falsify the spectral classification and/or analysis of the IR spectra.

Thus, there remains an unmet need in the art to test the quality of the mechanical properties and coating of slides for use with IR imaging.

Aspects of the present invention relate to methods and systems for performing a quality check for slides used in infrared imaging. The methods and systems may identify parameters of the slide that may affect the collection and analysis of spectral data of cells and tissue. The methods and systems may perform quality tests on the mechanical properties of the slide to ensure the slide may be used in infrared imaging.

The methods and systems may also include performing tests on the quality of the coatings of the slides. The method and systems may compare the reflectance against a reference spectrum measured from, for example, a gold coated slide (such a slide having a high reflectance, and will interchangeably referred to herein as a "high standard" slide). The methods and systems may also include determining a plurality of reference metrics for the slide by measuring a reflectance spectrum at a plurality of areas of the slide, using areas having no biological sample. In addition, the methods and systems may include comparing a ratio of the reference metrics and the standard reflectance to a calibration ratio; and determining an average quality assessment of the slide based on the comparison. The methods and systems may further include proceeding to use the slide in the infrared imaging when the average quality assessment of the slide is within an established quality value for diagnostic, prognostic and predictive applications.

Additional advantages and novel features relating to variations of the present invention will be set forth in part in the description that follows, and in part will become more apparent to those skilled in the art upon examination of the following or upon learning by practice of aspects thereof.

DETAILED DESCRIPTION

Aspects of the present invention relate to methods and systems for performing a quality check for a slide for use with a biological sample, such as may be used, for example, in infrared imaging. The methods and system may identify parameters of the slide that may affect the collection and analysis of data and/or be useful in identifying whether a slide is usable for a particular application. The methods and systems may perform quality tests on the mechanical properties and the coatings of the slide to ensure the slide may be used in such application, including, for example, slides for use in infrared imaging applications.

For example, transflection patterns ("IR spectra") may be obtained from tissues and used to detect and classify disease, in particular the types, stages and grades of cancer. For this task, the reflectivity and the homogeneity of the reflectivity of the sample substrate are of importance. The heterogeneity in reflectance may produce errors in the transflection spectra of as much as 0.02 optical density (OD) units. Such an error at certain wavelength may falsify the spectral classification or other analysis performed on the spectra.

Transflectance errors may be caused, for example, by insufficiency of one or more of the following: (a) reflectance coating reflectivity (i.e. reflectance of specific areas of the slide), (b) coating distribution homogeneity over the slide working surface, and/or (c) mechanical properties of the slide, such as features relating to flatness and parallel between the slide working surface in reference to the slide support surface. The slide support surface may be defined as the surface contacting the slide holder during FTIR measurements.

To achieve optimal FTIR data for diagnostic, prognostic and predictive applications, and/or to obtain data of quality useable for biological sample classification, including tissue and disease type sub-classification, as well as similar data used for research or clinical applications, for example, substrate surface reflectance homogeneity causing errors in transflectance need to be controlled.

Figure 1:
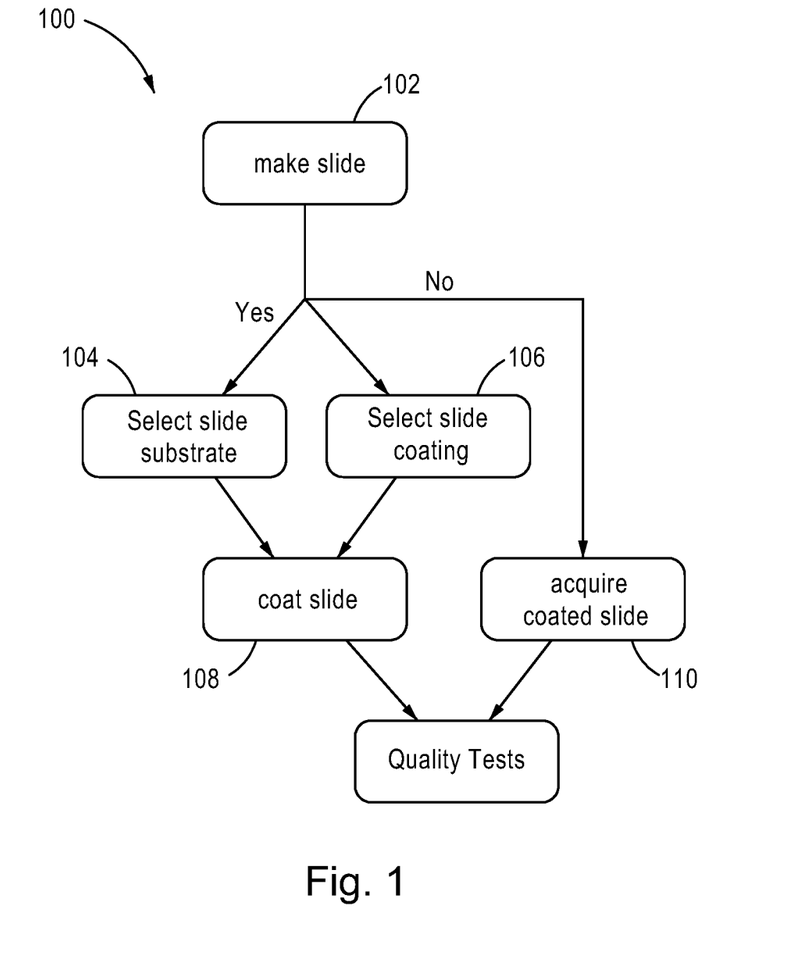
FIG. 1 is a flowchart illustrating a method of preparing a slide for use in accordance with an aspect of the present invention.

Referring now to FIG. 1, illustrated therein is an example method flow 100 for preparing a slide for use with aspects of the present invention. The method may include determining whether to make a slide 102 or acquire a coated slide 110. For example, the system may receive input to make a slide or acquire a slide. A slide may be acquired, for example, from a third party.

When the received input indicates making a slide, the method may include selecting a slide substrate 104, selecting a slide coating 106, and coating the slide 108. The system may receive input for the slide substrate. The slide substrate may include, for example, glass. In addition, the system may receive input for a slide coating. Coatings may be used for the following purposes, for example: (a) to reflect IR wavelengths used in the measurement, (b) to transmit visual wavelengths through the slide and mounted sample material, (c) to perform as a reference standard for reflectance to access slide surface reflectance quality and homogeneity, and/or (d) to act a control parameter for baseline reference spectra.

The slide coating may include any material suitable for applicable laboratory conditions. For example, the coating may comprise a metal. Alternatively, a biological or other synthetic material may be used, so long a reproducibility of a spectral signature as necessary for the application is achieved as a natural property of the reference. Coatings may include a single material and/or a combination of two or more selected materials. For example one coating may be gold, another coating may be Parylene C layered on gold; another coating may be silver/tin oxide; and yet another coating may be all gold and with a partial coating of Parylene C layered on gold. The system may include assembling the slide based upon the received inputs.

Upon acquiring a coated slide or making a coated slide, the system may proceed to perform one or more quality tests to determine and/or certify the quality of the slide for diagnostic, prognostic and predictive applications and/or to obtain data as to quality for use for biological sample classification, for example.

Figure 2:
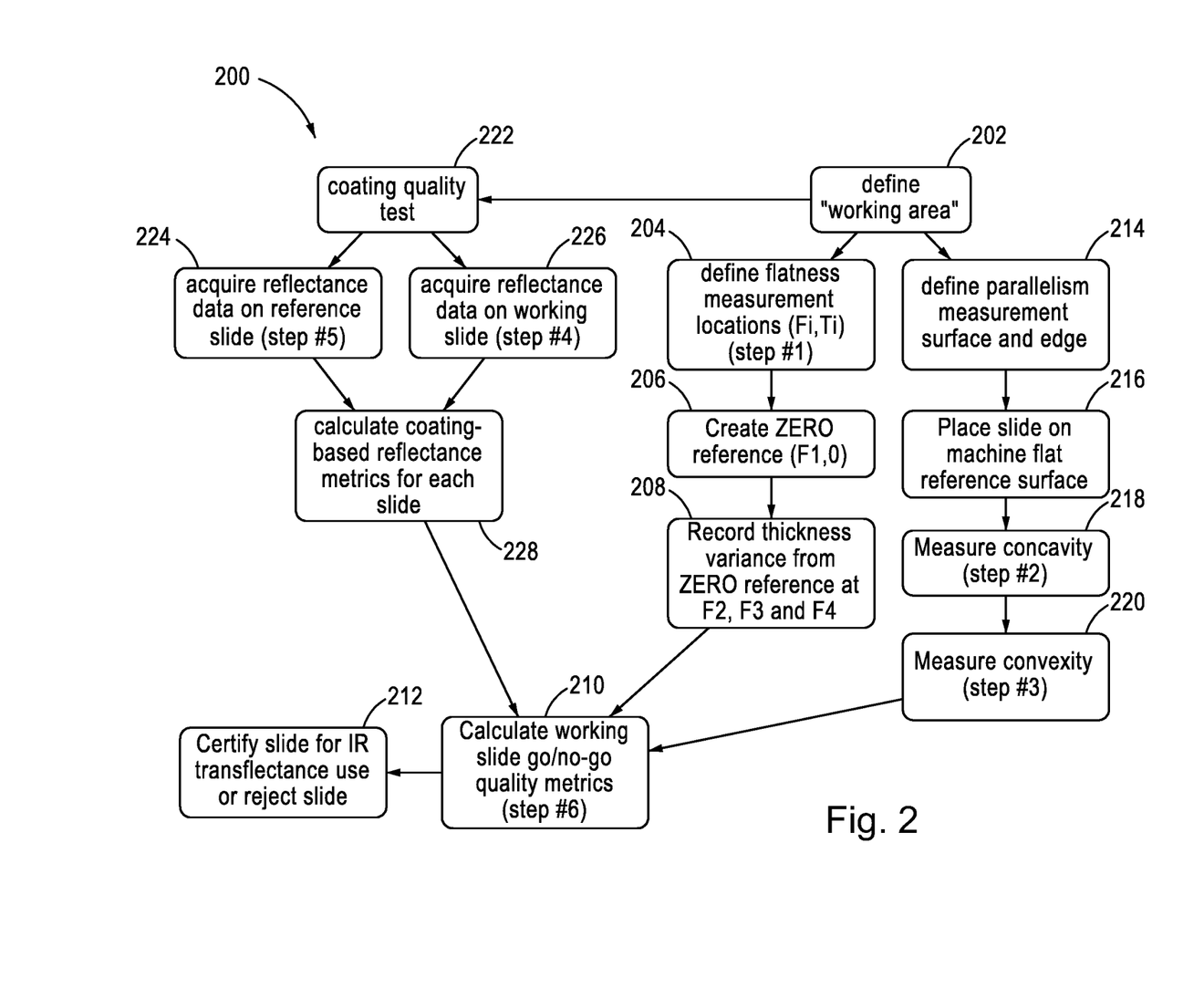
FIG. 2 is a flowchart illustrating a method of identifying a slide of appropriate quality in accordance with an aspect of the present invention.

Referring now to FIG. 2, illustrated therein is an example method flow 200 for determining and/or certifying or otherwise assessing slide quality in accordance with an aspect of the present invention. The method may include defining a working area of a slide 202. The working area of the slide may include any location on the slide where tissue or a biological sample may contact the surface of the slide. Contact may include, for example, placing and/or mounting tissue or biological samples on the slide, for example. In addition, the working area of the slide may include a region of the slide where FTIR measurements may occur. In an aspect, the system and/or method may include determining a working area of the slide, as illustrated in FIG. 3.

Figure 3:
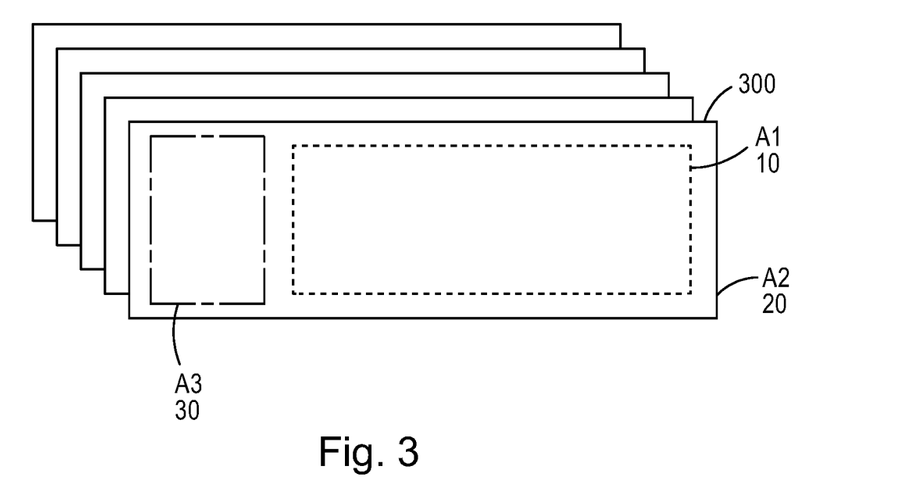
FIG. 3 illustrates an example slide having a working area for use in accordance with an aspect of the present invention.

Referring now to FIG. 3, illustrated therein is an example slide 300 for use in accordance with an aspect of the present invention. Slide 300 may have a working area 10 and a labeling area 30. Labeling area 30 may be a region of the slide where tissue or a biological sample will not be mounted on the slide. In an aspect, working area 10 may have an area less than the entire surface area 20 of slide 300.

Referring back to FIG. 2, defining the working area may include marking the slide to indicate the working area, where tissue or biological samples may be placed and/or mounted on the slide. For example, control may be made as to access to the working area of the slide where tissue or biological samples may be mounted or placed, and thus, the system may maintain a standard +/−tolerance relative to the working area.

The method may also include defining flatness measurement locations on the slide 204. Flatness measurement locations may include any location on the slide where the thickness of the slide may be measured. In an aspect, a plurality of flatness measurement locations may be selected on the slide. The flatness measurement locations may be used to determine variations in the thickness of the slide, for example. Among other things, variations in the thickness of the slide may affect the quality of the IR spectra transflected from the slide due to changes of the focal plane.

Figure 4:
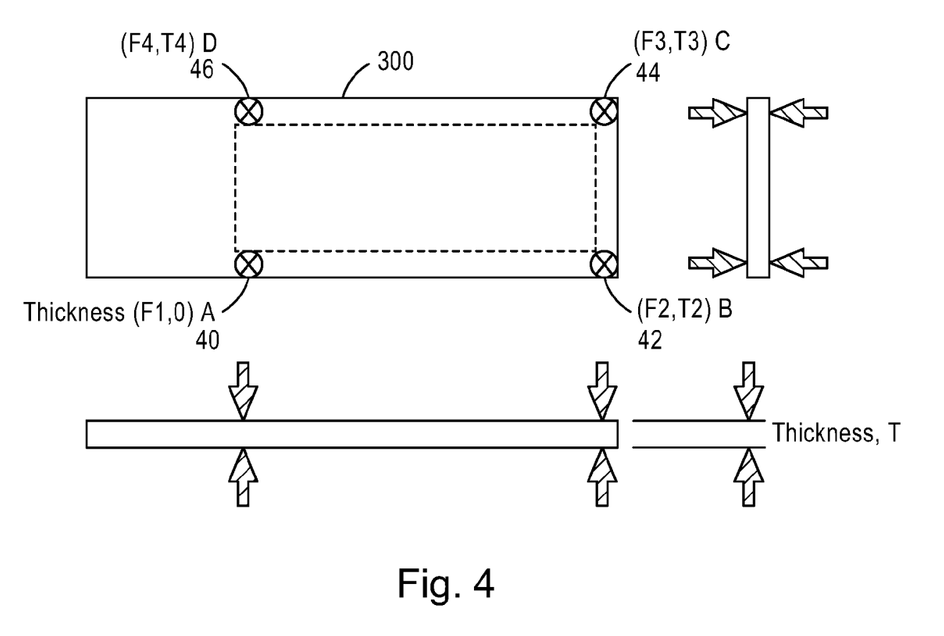
FIG. 4 illustrate example flatness measurement locations on a slide for use in accordance with an aspect of the present invention.

For example, the system may determine four flatness measurement locations 40, 42, 44, and 46 (FIG. 4) on slide 300 (FIG. 4), as illustrated in FIG. 4. While the flatness measurement locations 40, 42, 44, and 46 are illustrated on the corners outside of the working area 10, it should be noted that the flatness measurement locations may be selected from any suitable location on the slide. By selecting the flatness measurements locations outside of the working area, for example, damage to the working area may be reduced during the measurement process.

The method may also include creating a zero reference 206. A zero reference measurement may be taken at one of the selected flatness measurement locations 40, 42, 44, and 46 (FIG. 4A). For example, a flatness measurement location 40 for the zero reference measurement may be selected. In an aspect, a depth gauge measurement instrument, such as a reference micrometer, may be placed on slide 300 (FIG. 4) at flatness measurement location 40 and zeroed to create the zero reference measurement. The zero reference measurement may be recorded and stored for flatness measurement location 40.

The method may further include recording a thickness variance from the zero reference measurement 208. In an aspect, another flatness measurement location may be selected and a measurement of the thickness of the slide at the selected flatness measurement location may be taken.

The thickness variance (+/−) relative to the zero reference measurement may be recorded.

For example, a flatness measurement location 42 (FIG. 4) may be selected, and the thickness of the slide at flatness measurement location 42 measured. The measurement received at flatness measurement location 42 may be compared to the zero reference measurement and the thickness variance determined.

The next thickness measurement location may then be selected and the thickness of the slide measured at that selected thickness measurement location, and the process repeated until each of the thickness measurement locations are selected. For example, flatness measurement locations 44 and 46 may be selected and the measurements relative to the zero reference measurement recorded. The recorded thickness variances may be used to determine whether the slide is wedged and/or warped to produce variations in height, for example. A flat slide produces a thickness variance of zero at the remaining flatness measurement location. If the thickness variance is a value other than a zero measurement, it may be determined that the slide is wedged. The thickness variance for each slide may be used to determine the quality of the slide for biological sample imaging, for example. Variations in planarity of the slide may affect the focal plane with respect to the detector.

Returning to FIG. 2, the method may include determining whether the slide is within a quality threshold level 210 (e.g., for flatness). The quality threshold level may be a value determined to provide optimal and consistent data measured using the slide. For example, the system may compare the thickness variance for each slide with a quality threshold level for thickness variance to determine whether the slide is within the quality threshold. In an aspect, the quality threshold for thickness variance may be within ±2 ten thousands of an inch, or about 5 μm, may be within the quality threshold level. The focal depth of an IR beam at 6 μm wavelength is about 12 μm; thus, a variation in height of 5 μm may not be significant in IR imaging, for example.

The method may also include accepting or rejecting the slide 212 (e.g., based on flatness). The slide may be certified for use with analysis or the slide rejected, for example, based on whether the slide is within the quality threshold. In an aspect, if the slide is less than or equal to the quality threshold level, the slide may be certified for use with IR imaging. The tissue or biological sample may then be placed or mounted on the slide and the system may proceed with the IR imaging, for example. If the slide is above the quality threshold level, the slide may be rejected, for example, for use with IR imaging.

In addition, the method may include similarly defining a parallelism measurement surface and edge of the slide 214. The parallelism measurements may be used, for example, to determine whether the slide sits flat in the slide holder. Variations in planarity of the slide may affect the focal plane in respect to the tissue surface, for example.

Figure 5A:
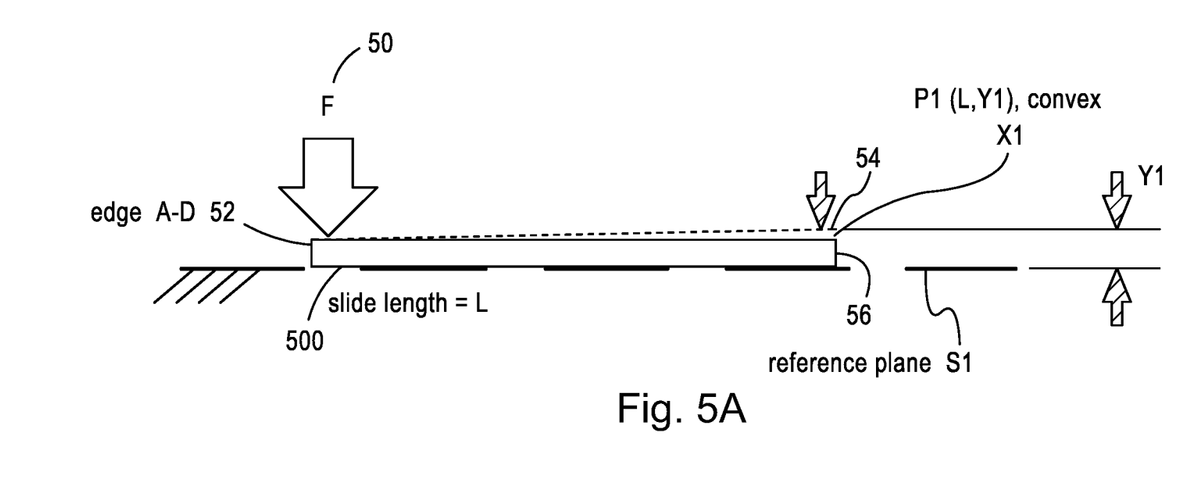
FIGS. 5A and 5B illustrate example parallelism measurements of a slide for use in accordance with an aspect of the present invention.

For determining parallelism, the method may also include placing the slide on a machine flat reference surface 216. For example, the machine flat reference surface may be an optical flat, such as a block of granite polished to a flatness specification. In an aspect, the slide 500 may be placed on a machine flat reference surface 56, as illustrated in FIG. 5A.

Figure 5B:
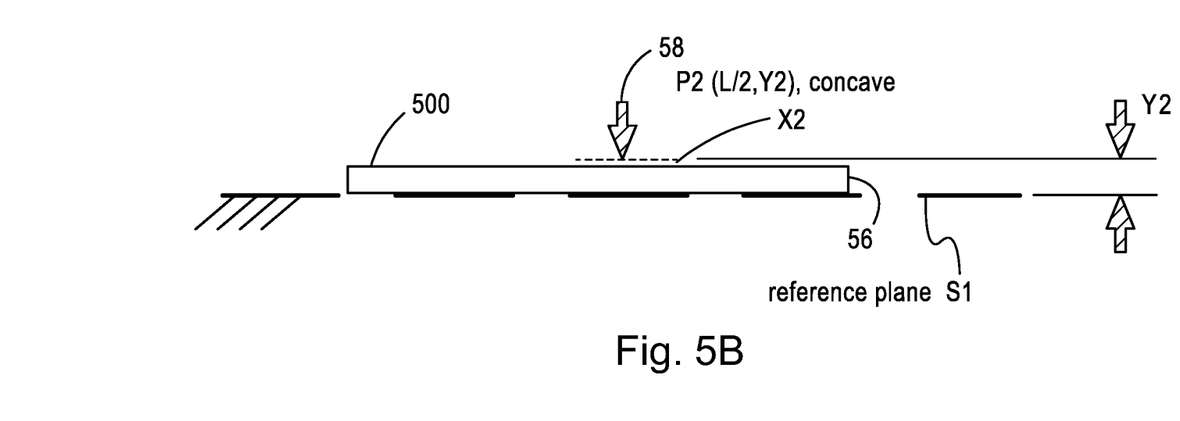

The method may further include measuring and recording the concavity of the slide 218. The distance X2 (FIG. 5B) may be measured from the top of the machine flat reference surface 56 to a bottom surface of the slide at a reference point 58 (FIG. 5B) in the middle of slide 500 (FIG. 5B). The distance X2 may be recorded as the concavity of the slide at reference point 58.

The method may also include measuring and recording the convexity of the slide 220. A downward force 50 (FIG. 5A) may be applied to edge 52 (FIG. 5A). If the edge 54 of the slide rises when force 50 is applied to edge 52, the distance X1 from the top of the machine flat reference surface 56 and the edge 54 of the slide may be recorded as the convexity of the slide.

The convexity measurements and the concavity measurements for each slide may be used to determine the quality of the slide (210, FIG. 2) for biological sample imaging. Variations in planarity (which affects the focal plane in respect to the tissue surface) may confound the observed spectral datasets, for example. As such, changes in focal height over the tissue plane, an effect that simulates non-planarity of the slide, may create errors in the transflection spectra.

The method may include determining whether the slide is within a quality threshold level 210 overall. The quality threshold level may be a value determined to provide optimal and consistent data measured using the slide. For example, the concavity and convexity measurements for each slide may be compared with a quality threshold level for the concavity and convexity, as described above, to determine whether the slide is within the quality threshold. In an aspect, the quality threshold for concavity and convexity may be ±2 ten thousands of an inch, or about 5 μm.

The method may also include accepting or rejecting the slide 212 based on both values. The slide may be certified, for example, for use with analysis or the slide rejected based on whether the slide is within the quality threshold. In an aspect, if the slide is less than or equal to the quality threshold level, the slide may be certified for use with IR imaging, for example. The tissue or biological sample may be placed or mounted on the slide and the system may proceed with the IR imaging. If the slide is above the quality threshold level, the slide may be rejected for use with IR imaging, for example.

In addition, the method may include performing a coating quality test on the slide 222. Coatings may be used, for example, for one or more of the following purposes: (a) to reflect IR wavelengths used in the measurement, (b) to permit visual wavelengths to transmit through the slide and mounted sample material, (c) to perform as a reference standard for reflectance to access slide surface reflectance quality and homogeneity, and/or (d) to act a control parameter for baseline reference spectra. Coatings may include a variety of materials and/or a combination of two or more materials.

A coating quality test may be used to control the heterogeneity of the coating on the slide working surface to achieve optimal FTIR data for diagnostic, prognostic and predictive applications and/or to obtain data of quality useable for biological sample classification, for example. By controlling the heterogeneity of the coating on the slide working surface, a standard+/−tolerance may be maintained to meet reflectance and homogeneity requirements, for example, causing maximum variation between any two transflectance spectra. In an aspect, the maximum variation between any two transflectance spectra may be less than 0.02 optical density units.

In addition, the coating quality test may include acquiring reflectance data on a reference slide 224. The reference slide may include a reference coating. Reference coatings may include any material suitable for applicable laboratory conditions. For example, the substrate may comprise a metal. Alternatively, a biological or other synthetic material may be used, so long a reproducibility of a spectral signature is achieved as a natural property of the reference. Reference coatings may include a single material and/or a combination of two or more selected materials.

In an aspect, the reference slide may have a gold coating. Gold has a reflectivity of ~99.4% in the mid-infrared range; since gold is not oxidized in air, this reflectivity remains constant with time and may be used as a standard for calibration of the slides.

Figure 6:
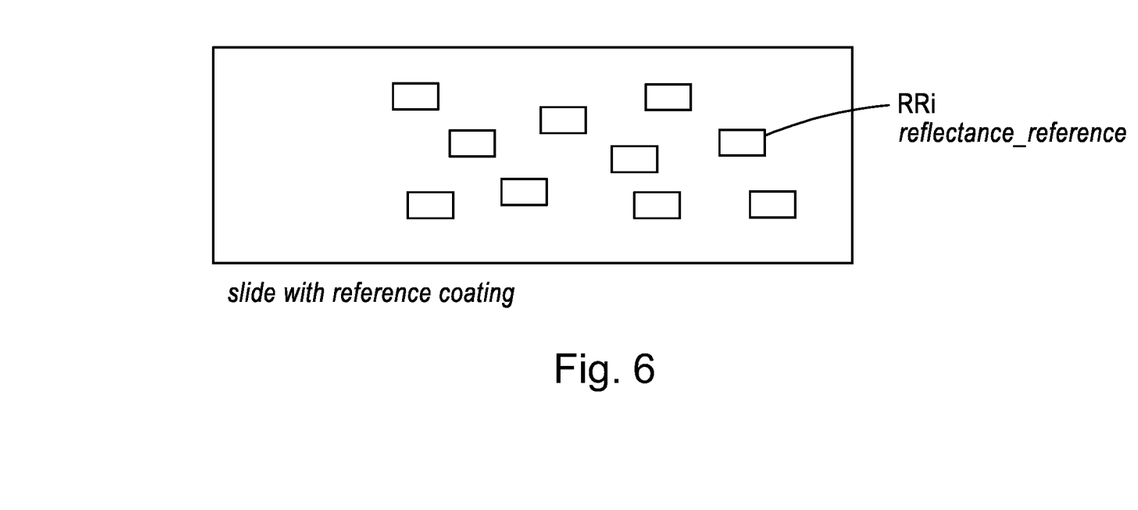
FIG. 6 illustrates example image collection locations on a reference slide for use in accordance with an aspect of the present invention.

For example, the system may acquire reflectance data on the reference slide by randomly selecting a number of locations on the reference slide. FIG. 6 illustrates example image collection locations A-J on a reference slide 600 in accordance with an aspect of the present invention. In an aspect, the system randomly selected ten locations A-J (FIG. 6) on slide 600 (FIG. 6).

In an aspect, the reflectance of a gold slide may be measured at one location, in reflectance mode, with an Agilent 620/670 imaging infrared microscope, using a 128× 128 (=16384) element focal plane array (FPA) detector. The field of view (FOV) of one such measurement is approximately 700 μm×700 μm. The 16384 individual reflection spectra may be averaged and stored as one intensity vector, $S^{Au}(v)$. The reflectance of the gold slide may be used as a reference spectrum for the coating quality test, for example.

Figure 7:
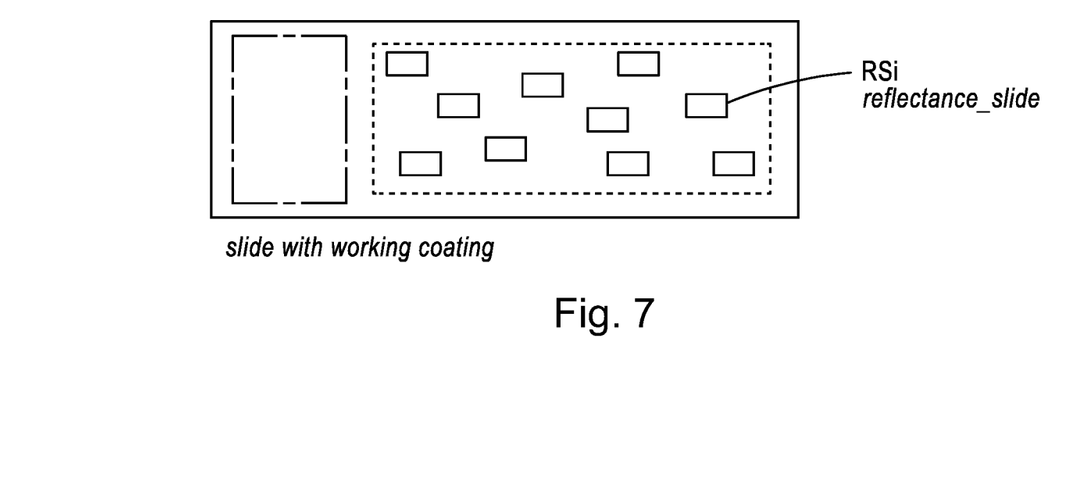
FIG. 7 illustrates example image collection locations on a working slide for use in accordance with an aspect of the present invention.

The coating quality test may also include acquiring reflectance data on working slide 226. For example, reflectance data on the working slide may be acquired by randomly selecting a number of locations on the working slide within the working area. FIG. 7 illustrates example image collection locations A-J on a working slide 300 in accordance with an aspect of the present invention. In an aspect, the system randomly selected ten locations A-J (FIG. 7) on slide 300 (FIG. 7) within the working area 10 having no biological sample.

In an aspect, ten individual FOVs, A, B, C . . . J, of one working slide 300 may be acquired, with the individual acquisitions spread over the slide surface as shown in FIG. 7. For each FOV, a mean reflection vector may be constructed by averaging 16384 individual spectral traces, and stored as $S^K(v)$, where K=A, B, C . . . J. The reference metric for the working slide may establish a control parameter for the baseline reference spectra, for example.

The coating quality test may also include calculating reflectance metrics for each slide 228. The reflectance metric for each slide may be used to establish the quality of the slide for biological sample imaging, for example. In an aspect, the system may calculate 'null-spectra' $S_0^K$ for each of the ten FOVs, where a 'null-spectrum' is defined as $$S_0^K = -\log \frac{S^K(v)}{S^{Au}(v)} \quad (1)$$

Figure 8A:
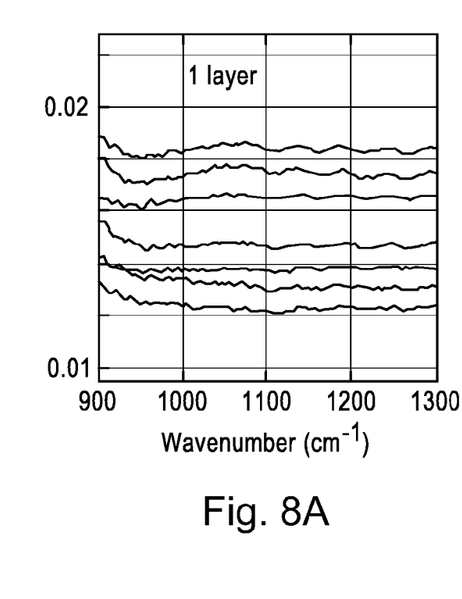
FIGS. 8A-8C illustrate example results from tests for use in accordance with aspects of the present invention.

If the reflectivity of any FOV, say A, is about the same as that of gold, than the fraction $$\frac{S^K(v)}{S^{Au}(v)}$$

would be unity, and the log would be zero (hence the term 'null-spectrum'). The null spectra obtained for a standard low-e slide are shown in FIG. 8A. The observed null spectra deviate from zero by experimental noise and the fact that the silver slides have a slightly lower reflectivity (96%) than gold. However, the offset, along the ordinate indicates changes in reflectivity by about 1% (96 to 97%).

The method may include determining whether the slide is within a quality threshold level 210 with respect to coating quality. The quality threshold level may be a value determined to provide optimal and consistent data measured using the slide. For example, the reflectance metrics for each slide may be used to determine an average quality assessment of the coating of the slide. The average quality assessment of the coating may be compared to a range of the quality threshold. An example quality threshold for the reflectance metrics may be less than or equal to 0.01 from 950 to 1300 wavenumber (cm^-1), as illustrated, for example, in FIG. 8B.

Figure 8B:
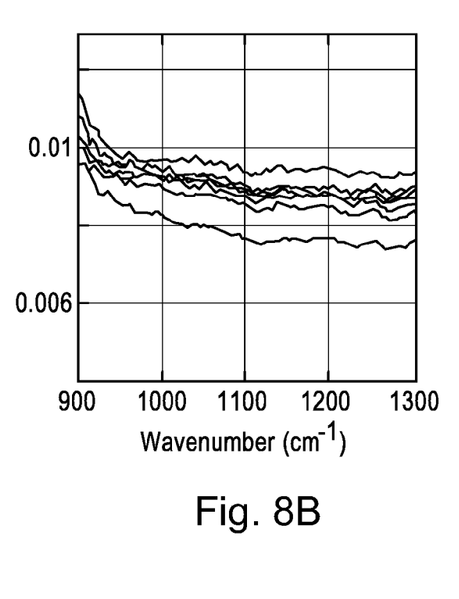
Figure 8C:
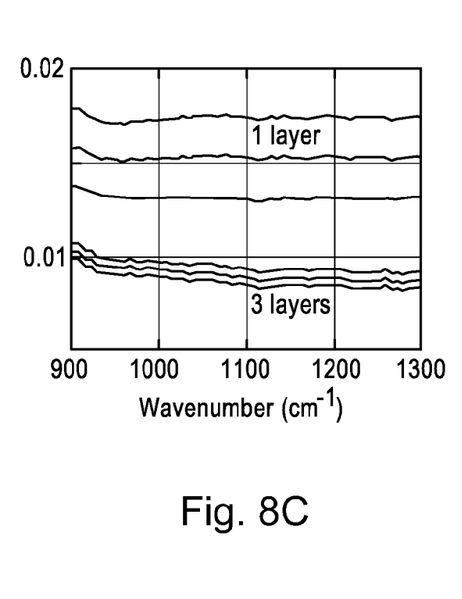

Referring now to FIGS. 8A-8C, illustrated therein are example results in accordance with aspects of the present invention. FIG. 8A illustrates null spectra from 9 FOVs of a standard low-e slide, measured against a gold-coated slide. FIG. 8B illustrates null spectra from 9 FOVs of a 3-layer low-e slide (e.g., a sample from Kevley Technologies referred to as low-e$^3$ slide) that is produced by depositing three thin layers of silver on the glass slide, measured against a gold-coated slide. This plot indicates reflectivities of between 98.0 and 98.6%. The difference in performance of the two slides is demonstrated in FIG. 8C, which illustrates the mean reflectivity for the standard low-e slide (top) and the low-e$^3$ (bottom), along with the standard deviations (dotted lines). This panel also demonstrates the higher homogeneity of the reflectance in the low-e$^3$ slides (i.e. slides with more than a single layer coating).

Referring back to FIG. 2, the method may also include accepting or rejecting the slide 212. The system may certify the slide for use with analysis or reject the slide based on whether the slide is within the quality threshold. In an aspect, if the slide is less than or equal to the quality threshold level, the system may certify the slide for use with IR imaging. The tissue or biological sample may be placed or mounted on the slide and the system may proceed with the IR imaging. If the slide is above the quality threshold level, the system may reject the slide for use with IR imaging.

As such, when the slides are certified as passing the quality checks, the slides may be used for diagnostic, prognostic and predictive applications and/or to obtain data of quality useable for biological sample classification or clinical applications.

Figure 9:
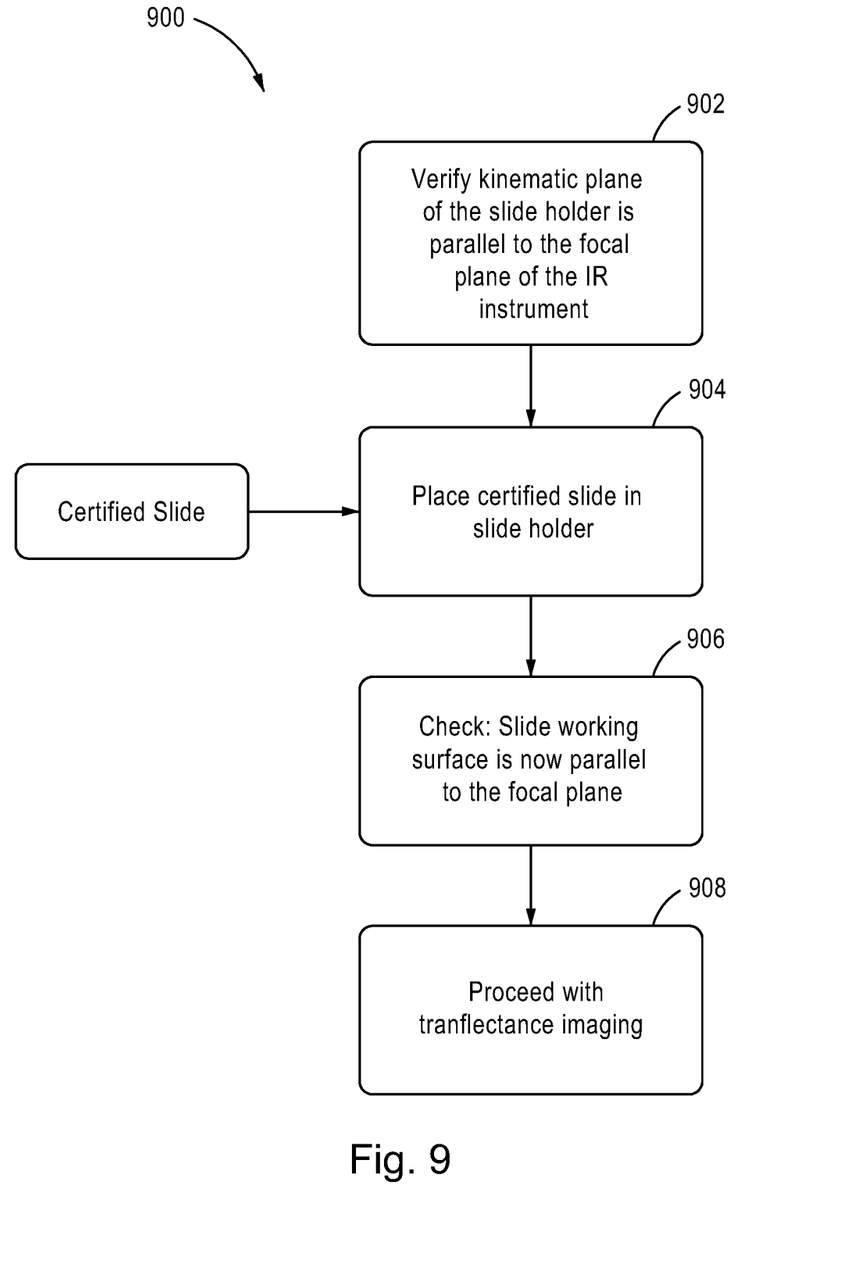
FIG. 9 illustrates a flowchart illustrating a method of ascertaining whether the working surface of the slide is parallel to the focal plane of the infrared spectrometer in accordance with an aspect of the present invention.
Figure 10A:
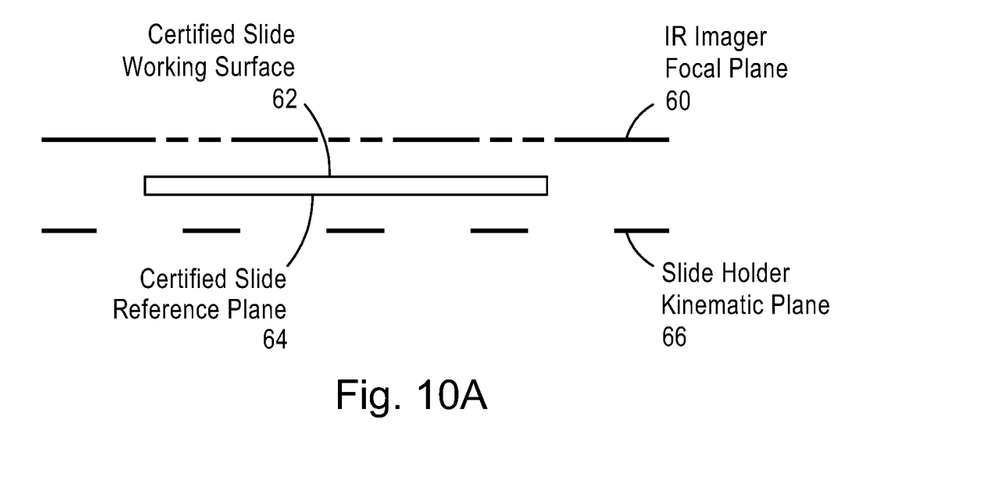
FIGS. 10A and 10B illustrate example planes in accordance with an aspect of the present invention.

Referring now to FIG. 9, illustrated therein is a method 900 for ascertaining whether the working surface of the slide is parallel to the focal plane of the infrared spectrometer in accordance with an aspect of the present invention. The working surface of the slide may be defined as the surface upon which the biological material is placed. The working surface of the slide may also include a coating applied to the slide. In addition, the working surface 62 (FIG. 10A) of the slide may be opposite a reference plane 64 (FIG. 10A) of the slide. The method may include verifying that a kinematic plane of the slide holder is parallel to the focal plane of the infrared instrument 902. For example, an alignment device may be used to verify that the kinematic plane of the slide holder 66 (FIG. 10A) is parallel to the focal plane of infrared instrument 60 (FIG. 10A), such as an infrared spectrometer. A slide with perfect planarity, when placed in the spectrometer, may present a working surface that is not co-planar with the focal plane due to imperfections in the slide holder causing the certified slide to effectively be tilted. As such, the verification of the kinematic plane of the slide to the focal plane of the infrared spectrometer may account for variations in the slide holder. In an aspect, the co-planarity may be ascertained via an adjustable, three point kinematic mount that may adjust for imperfections in the orientation of the microscope table.

Figure 10B:
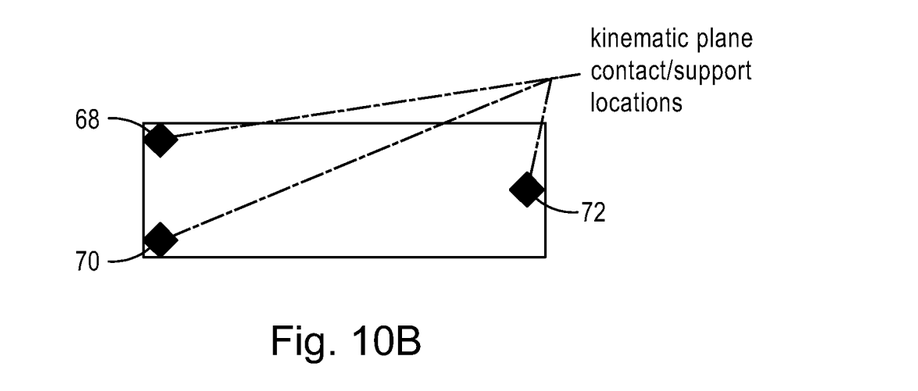

After verifying the slide holder receiving surface is parallel to the focal plane of the instrument a certified slide (as certified, for example, by the method disclosed in reference to FIG. 2) may be place in the slide holder 904. For example, the slide holder receiving surface may be constructed to provide three landing surface or points 68, 70, 72 (FIG. 10B) to form a kinematic plane, as illustrated in FIG. 10B. In this example, the reference plane 64 (FIG. 10A) of the slide contacts the kinematic plane 66 (FIG. 10A) in three point or area locations 68, 70, 72 (FIG. 10B), as only three points are required to form a plane.

The method may also include verifying that the slide working surface is parallel to the focal plane of the infrared instrument 906. For example, an alignment device may be used to verify that the slide working surface 62 (FIG. 10A) is parallel to the focal plane 60 (FIG. 10A) of infrared spectrometer. In addition, the method may include proceeding with IR imaging when the slide working surface is parallel to the focal plane of the infrared instrument 908. By ascertaining that the slide working surface is parallel to the focal plane of the infrared spectrometer, the quality of the IR spectra transflected may be improved.

Figure 11:
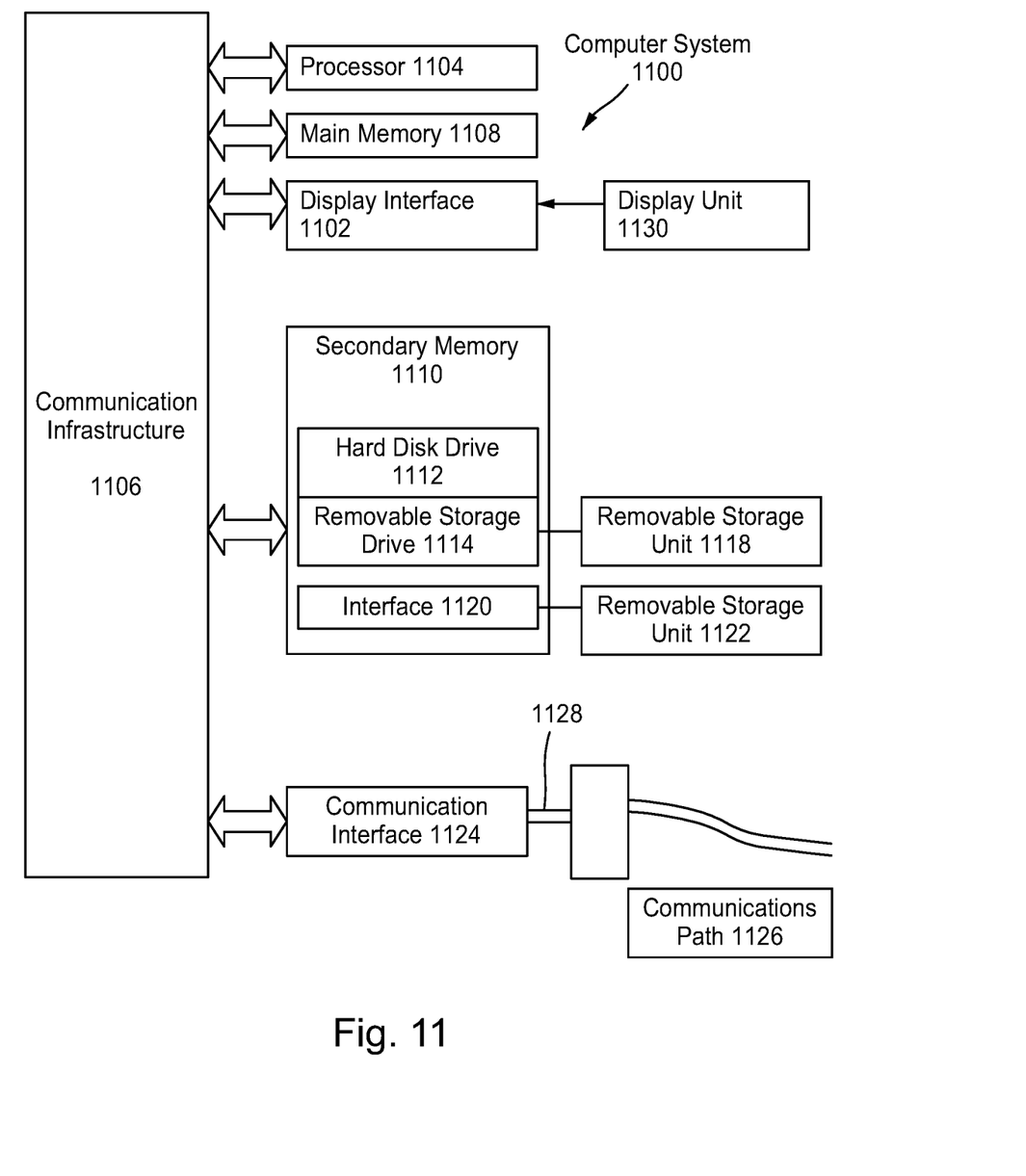
FIG. 11 shows various features of a computer system for use in conjunction with aspects of the invention.

Aspects of the invention may be implemented using hardware, software or a combination thereof and may be implemented in one or more computer systems or other processing systems. In one variation, aspects of the invention are directed toward one or more computer systems capable of carrying out the functionality described herein. An example of such a computer system 1100 is shown in FIG. 11.

Computer system 1100 includes one or more processors, such as processor 1104. The processor 1104 is connected to a communication infrastructure 1106 (e.g., a communications bus, cross-over bar, or network). Various software aspects are described in terms of this exemplary computer system. After reading this description, it will become apparent to a person skilled in the relevant art(s) how to implement the aspects of invention using other computer systems and/or architectures.

Computer system 1100 can include a display interface 1102 that forwards graphics, text, and other data from the communication infrastructure 1106 (or from a frame buffer not shown) for display on the display unit 1130. Computer system 1100 also includes a main memory 1108, preferably random access memory (RAM), and may also include a secondary memory 1110. The secondary memory 1110 may include, for example, a hard disk drive 1112 and/or a removable storage drive 1114, representing a floppy disk drive, a magnetic tape drive, an optical disk drive, etc. The removable storage drive 1114 reads from and/or writes to a removable storage unit 1118 in a well-known manner. Removable storage unit 1118, represents a floppy disk, magnetic tape, optical disk, etc., which is read by and written to removable storage drive 1114. As will be appreciated, the removable storage unit 1118 includes a computer usable storage medium having stored therein computer software and/or data.

In alternative variations, secondary memory 1110 may include other similar devices for allowing computer programs or other instructions to be loaded into computer system 1100. Such devices may include, for example, a removable storage unit 1122 and an interface 1120. Examples of such may include a program cartridge and cartridge interface (such as that found in video game devices), a removable memory chip (such as an erasable programmable read only memory (EPROM), or programmable read only memory (PROM)) and associated socket, and other removable storage units 1122 and interfaces 1120, which allow software and data to be transferred from the removable storage unit 1122 to computer system 1100.

Computer system 1100 may also include a communications interface 1124. Communications interface 1124 allows software and data to be transferred between computer system 1100 and external devices. Examples of communications interface 1124 may include a modem, a network interface (such as an Ethernet card), a communications port, a Personal Computer Memory Card International Association (PCMCIA) slot and card, etc. Software and data transferred via communications interface 1124 are in the form of signals 1128, which may be electronic, electromagnetic, optical or other signals capable of being received by communications interface 1124. These signals 1128 are provided to communications interface 1124 via a communications path (e.g., channel) 1126. This path 1126 carries signals 1128 and may be implemented using wire or cable, fiber optics, a telephone line, a cellular link, a radio frequency (RF) link and/or other communications channels. In this document, the terms "computer program medium" and "computer usable medium" are used to refer generally to media such as a removable storage drive 1114, a hard disk installed in hard disk drive 1112, and signals 1128. These computer program products provide software to the computer system 1100. Aspects of the invention are directed to such computer program products.

Computer programs (also referred to as computer control logic) are stored in main memory 1108 and/or secondary memory 1110. Computer programs may also be received via communications interface 1124. Such computer programs, when executed, enable the computer system 1100 to perform the features in accordance with aspects of the invention, as discussed herein. In particular, the computer programs, when executed, enable the processor 1104 to perform such features. Accordingly, such computer programs represent controllers of the computer system 1100.

In a variation where aspects of the invention are implemented using software, the software may be stored in a computer program product and loaded into computer system 1100 using removable storage drive 1114, hard drive 1112, or communications interface 1124. The control logic (software), when executed by the processor 1104, causes the processor 1104 to perform the functions as described herein. In another variation, aspects of the invention are implemented primarily in hardware using, for example, hardware components, such as application specific integrated circuits (ASICs). Implementation of the hardware state machine so as to perform the functions described herein will be apparent to persons skilled in the relevant art(s).

In yet another variation, aspects of the invention are implemented using a combination of both hardware and software.

Figure 12:
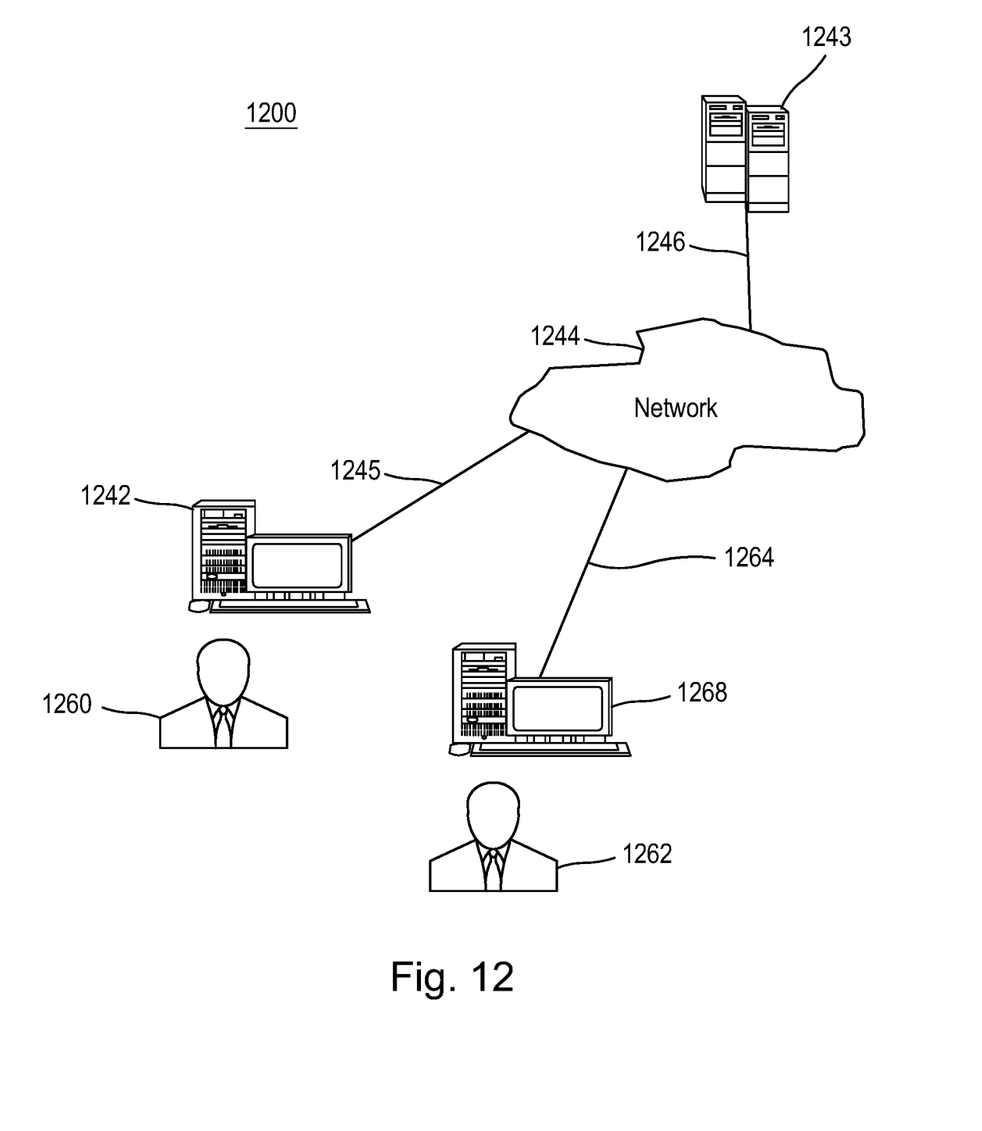
FIG. 12 shows an example computer system for use in conjunction with aspects of the invention.

FIG. 12 shows a communication system 1200 usable in accordance with aspects of the disclosure. The communication system 1200 includes one or more accessors 1260, 1262 (also referred to interchangeably herein as one or more "users") and one or more terminals 1242, 1266. In one aspect of the disclosure, data for use is, for example, input and/or accessed by accessors 1260, 1262 via terminals 1242, 1266, such as personal computers (PCs), minicomputers, mainframe computers, microcomputers, telephonic devices, or wireless devices, personal digital assistants ("PDAs") or a hand-held wireless devices (e.g., wireless telephones) coupled to a server 1243, such as a PC, minicomputer, mainframe computer, microcomputer, or other device having a processor and a repository for data and/or connection to a repository for data, via, for example, a network 1244, such as the Internet or an intranet, and/or a wireless network, and couplings 1245, 1246, 1264. The couplings 1245, 1246, 1264 include, for example, wired, wireless, or fiberoptic links. In another aspect of the disclosure, the method and system of the disclosure may include one or more features that operate in a stand-alone environment, such as on a single terminal.

While aspects of this invention have been described in conjunction with the example features outlined above, alternatives, modifications, variations, improvements, and/or substantial equivalents, whether known or that are or may be presently unforeseen, may become apparent to those having ordinary skill in the art. Accordingly, the example aspects of the invention, as set forth above, are intended to be illustrative, not limiting. Various changes may be made without departing from the spirit thereof. Therefore, aspects of the invention are intended to embrace all known or later-developed alternatives, modifications, variations, improvements, and/or substantial equivalents.

The invention claimed is:

1. A method for performing a quality test for a slide for use with a biological sample in infrared imaging, the method comprising:
    receiving a high standard reflectance reference spectrum and measuring the reflectance spectrum from a high standard performing slide;
    defining a working area of a slide for use with a biological sample;
    determining a plurality of reference metrics for the slide for use with the biological sample by measuring a reflectance spectrum at a plurality of areas within the working area of the slide, each of the measured areas having no biological sample appearing thereon;
    comparing a ratio of the plurality of reference metrics and the high standard reflectance spectrum to produce a calibration ratio;
    determining an average quality assessment of the slide for use with the sample based on the comparison; and
    certifying a quality of the slide when the average quality assessment of the slide is within the established quality value range.

2. The method of claim 1, wherein the high standard reflectance reference spectrum is an average of a plurality of reflectance spectrum received from a plurality of areas of the high standard performing slide.

3. The method of claim 2, wherein the average quality assessment of the slide is calculated using a null spectrum.

4. The method of claim 1, wherein the high standard performing slide is gold coated.

5. The method of claim 1, further comprising:
    receiving and recording a thickness variance of the slide, and
    wherein certifying the quality of the slide further comprises determining whether the thickness variance of the slide is within a thickness variance quality threshold value.

6. The method of claim 1, further comprising:
    receiving and recording a concavity measurement of the slide, and
    wherein certifying the quality of the slide further comprises determining whether the concavity measurement is within a concavity quality threshold value.

7. The method of claim 1, further comprising:
    receiving and recording a convexity measurement of the slide, and
    wherein certifying the quality of the slide further comprises determining whether the convexity measurement is within a convexity quality threshold value.

8. A system for performing a quality test for a slide for use with a biological sample in infrared imaging, the system comprising:
    a memory in communication with a processor, wherein the memory and the processor are cooperatively configured to:
        receive a high standard reflectance reference spectrum and measuring the reflectance spectrum from a high standard performing slide;
        define a working area of a slide for use with a biological sample;
        determine a plurality of reference metrics for the slide for use with the biological sample by measuring a reflectance spectrum at a plurality of areas within the working area of the slide, each of the measured areas having no biological sample appearing thereon;
        compare a ratio of the plurality of reference metrics and the high standard reflectance spectrum to produce a calibration ratio;
        determine an average quality assessment of the slide for use with the sample based on the comparison; and
        certify a quality of the slide when the average quality assessment of the slide is within the established quality value range.

9. The system of claim 8, wherein the memory and the processor are further cooperatively configured to calculate the high standard reflectance reference spectrum by averaging a plurality of reflectance spectrum received from a plurality of areas of the high standard performing slide.

10. The system of claim 9, wherein the memory and the processor are further cooperatively configured to calculate the average quality assessment of the slide using a null spectrum.

11. The system of claim 8, wherein the high standard performing slide is gold coated.

12. The system of claim 8, wherein the memory and the processor are further cooperatively configured to:
    receive and record a thickness variance of the slide, and
    wherein the quality of the slide is certified when the thickness variance of the slide is within a thickness variance quality threshold value.

13. The system of claim 8, wherein the memory and the processor are further cooperatively configured to:
    receive and record a concavity measurement of the slide, and
    wherein the quality of the slide is certified when the concavity measurement is within a concavity quality threshold value.

14. The system of claim 8, wherein the memory and the processor are further cooperatively configured to:
    receive and record a convexity measurement of the slide, and
    wherein the quality of the slide is certified when the convexity measurement is within a convexity quality threshold value.

15. The system of claim 8, wherein the memory and the processor are further cooperatively configured to verify a working surface of the slide is parallel to a focal plane of an infrared imaging instrument.

16. The system of claim 15, wherein the memory and the processor are further cooperatively configured to image the biological sample when the working surface of the slide is parallel to the focal plane of the infrared imaging instrument.

17. The system of claim 15, wherein the memory and the processor are further cooperatively configured to verify a kinematic plane of a slide holder of the infrared imaging instrument is parallel to the focal plane of the infrared imaging instrument.

18. The system of claim 8, wherein the memory and the processor are further cooperatively configured to image the biological sample when the quality of the slide is certified.

19. A non-transitory computer program product, comprising: a computer-readable medium including: at least a first instruction for causing a computer to receive a high standard reflectance reference spectrum and measuring the reflectance spectrum from a high standard performing slide; at least a second instruction for causing the computer to define a working area of a slide for use with a biological sample; at least a third instruction for causing the computer to determine a plurality of reference metrics for the slide for use with biological sample by measuring a reflectance spectrum at a plurality of areas within the working area of the slide, each of the measured areas having no biological sample appearing thereon; at least a fourth instruction for causing the computer to compare a ratio of the plurality of reference metrics and the high standard reflectance spectrum to produce a calibration ratio; at least a fifth instruction for causing the computer to determine an average quality assessment of the slide for use with the sample based on the comparison; and at least a sixth instruction for causing the computer to certify a quality of the slide when the average quality assessment of the slide is within the established quality value range.

\* \* \* \* \*